United States Patent Office 3,165,101
Patented Jan. 12, 1965

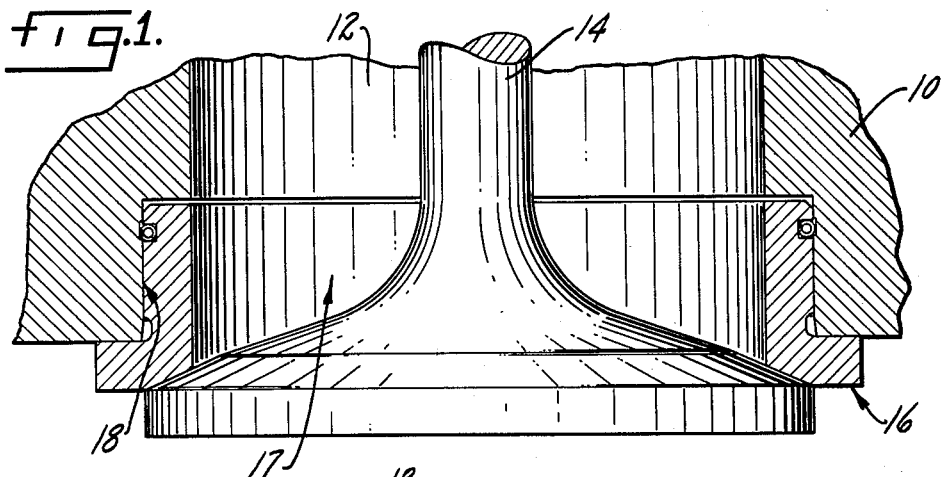
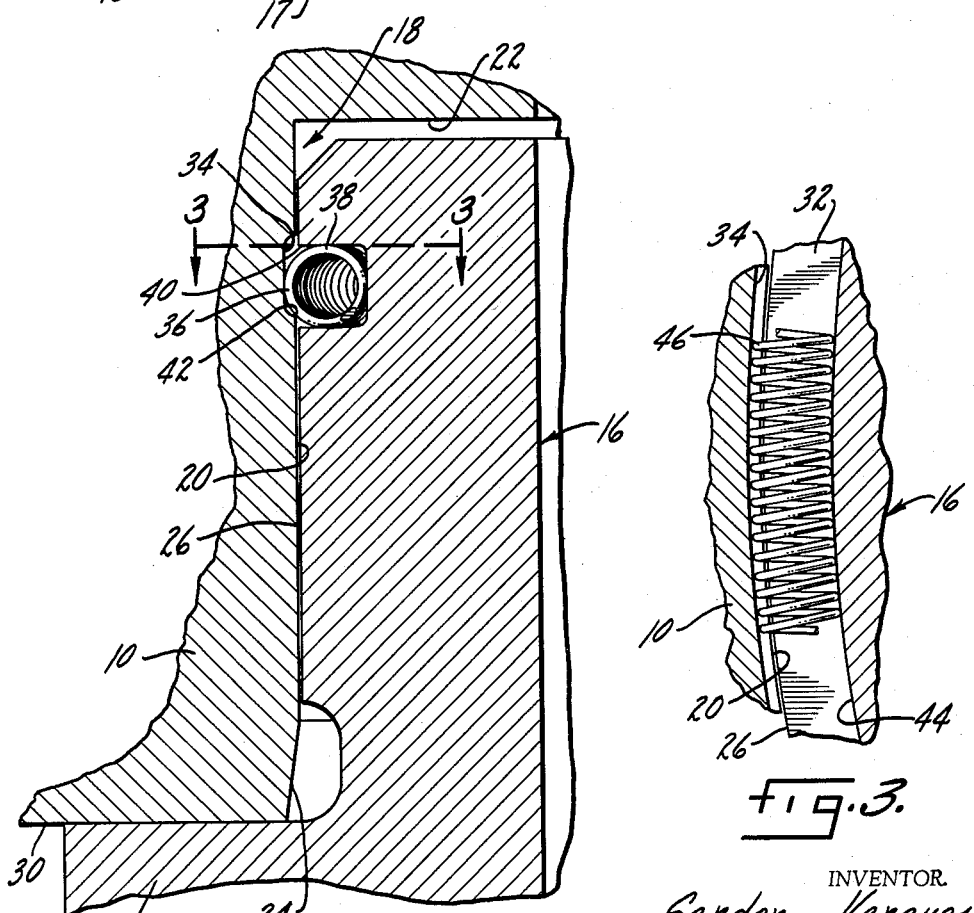

3,165,101
LOCKING ARRANGEMENT FOR VALVE SEAT INSERT
Sandor Vargyai, Milwaukee, Wis., assignor to Nordberg Manufacturing Company, Milwaukee, Wis., a corporation of Wisconsin
Filed Apr. 1, 1964, Ser. No. 356,617
5 Claims. (Cl. 123—188)

This invention relates to a valve seat insert, and particularly to an insert construction which will prevent drop-out or removal of the insert during engine operation.

One purpose of the invention is an insert of the type described which includes a coiled spring having separated spring coils which permit compression of the spring for installation of the insert.

Another purpose is a valve seat insert construction of the type described utilizing a spring, which is partially positioned within corresponding grooves in the cylinder and insert walls such that the relative position of the grooves and spring prevents removal of the insert.

Another purpose is an insert and cylinder passage construction of the type described which provided an inwardly directed holding force on the insert.

Other purposes will appear in the ensuing specification, drawings and claims.

The invention is illustrated diagrammatically in the following drawings wherein:

FIGURE 1 is a fragmentary vertical section of a valve seat insert, a valve port formed in an engine cylinder, and the associated valve member, FIGURE 2 is a greatly enlarged section illustrating the valve seat insert and the passage wall construction, and FIGURE 3 is a section along plane 3—3 of FIGURE 2.

The present invention has utility in internal combustion engines of a variety of types. For example, the problems solved by the present invention are directly related to large internal combustion engines, for example diesel engines, gas engines or dual fuel engines in which the cylinder has a bore in the neighborhood of 13 to 21 inches. Obviously, the invention should not be limited to cylinders of this size or to engines of this general type. The present invention has general utility in all types of internal combustion engines utilizing a valve seat insert.

An engine cylinder is diagrammatically indicated at 10 with a gas cylinder passage or bore being indicated at 12. The member 10 may represent the cylinder head or the cylinder proper either or which may have gas passages. A valve member 14 will reciprocate from the closed position shown in FIGURE 1 to an open position in which the passage 12 is in communication with the combustion chamber formed within the cylinder 10. A valve seat insert 16 is positioned in port 17 where the passage 12 opens into the combustion chamber.

The passage 12 may include an outwardly offset portion 18 having an axial wall 20 and a radial wall 22. Preferably, the axial wall 20 is outwardly chamfered or tapered, as at 24, for the ease in installing the insert. A chamfer of seven degrees is satisfactory, but the invention should not be so limited.

The insert 16 may be generally L-shaped, as illustrated in FIGURES 1 and 2, and has an axially extending wall 26 which has a slightly larger outer diameter than the diameter of the wall 20 to provide an interference fit between these two walls when the insert is seated. The interference fit is not, however, as tight as has previously been used in inserts of this type because of the improved holding arrangement described herein. The insert 16 may have a bottom portion or lower portion 28 which abuts firmly against lower radial wall 30 of the cylinder 10 when the insert is in its fully inserted or seated position.

The insert 16 may have an outer annular groove 32 which is generally in opposition with, but slightly misaligned from an internal annular groove 34 formed in passage wall 20. A coiled spring 36 is positioned in the grooves 32 and 34, as illustrated particularly in FIGURE 2. The outer diameter of each of the coils of spring 36 is slightly greater than the radial depth of groove 32 such that the spring extends into groove 34. The individual coils 46 are separated, one from another, by a sufficient amount such that the spring may be collapsed so that it lies substantially within the confines of groove 32. This is for installation. Note particularly that the upper annular surface of spring 36, formed by the upper surfaces of adjacent coils, as indicated at 38, is in contact with the innermost radial surface 40 of groove 32. Groove 34 has a lower radial edge 42 which is also in circumferential or annular contact with spring 36. In effect, any outwardly directed force applied to the insert, for example a pull on the insert, or the weight of the insert tending to move it out of the port, will be resisted by a radially inward and axially inward force applied from edge 42 to spring 36 and by the spring 36 against surface 40 and against surface 44 which forms the axial inward surface of groove 32. The direction of the force is diagonal and this force will resist any outward movement of the insert.

FIGURE 3 illustrates the details of the spring 36. Note particularly that adjacent coils 46 are separated so that the spring may be compressed by circumferential relative movement between the spring and the surface of wall 20. This permits the spring to be compressed substantially within the confines of groove 32 for installation purposes.

The use, operation and function of the invention are as follows:

The insert is installed in the cylinder port by first bringing the insert and spring 36 which has previously been positioned in groove 32 to a temperature in the neighborhood of −100 to −110 degrees F. The insert is pushed into the cylinder or cylinder head port until the spring has fully entered into the lead chamfered portion 24. The insert is then rotated a few degrees as it is further pushed into the passage. By rotating the insert a few degrees it is possible to compress the spring within the confines of groove 32 so that then the insert and spring may be fully pushed into the passage. The seating of the insert requires substantially less force than used heretofore principally because of the reduced interference fit between the insert and the passage walls. Of importance is the fact that the spring coils are separated as this permits the spring to be compressed or collapsed, as described, with relative ease. The spring and insert are pushed to the fully installed position of FIGURE 2 in which the portion 28 of the insert firmly abuts the surface 30 on the cylinder head. Note particularly that the grooves 32 and 36 are substantially in alignment but are slightly misaligned to provide an edge or surface 42 against which the spring is held. The particular relationship between the grooves and the spring provides a diagonally inwardly directed force to hold the insert within the cylinder head. Any tendency for the insert to drop out, for example because of loosening of the insert due to differential heat expansion between the insert and cylinder, is resisted by this diagonally inwardly directed force.

The manner of installation is important. If an attempt is made to merely push the insert straight into the cylinder head, the spring would be damaged or the insert would not be properly inserted. It is necessary to slightly twist or revolve the insert and spring so that the turns or coils of the spring collapse enough to shrink the outer diameter of the spring to the inner diameter of the passage. After the spring coils have been collapsed, the insert will then slide in and the spring will pop out after it has reached groove 34.

Whereas the preferred form of the invention has been shown and described herein, it should be realized that there are many modifications, alterations and substitutions thereto within the scope of the following claims.

I claim:

1. In combination with a cylinder of an internal combustion engine, said cylinder having at least one valve port, a valve seat insert positioned in said port, said insert having an outer annular groove, said cylinder having an internal annular groove generally in opposition to and in communication with said insert annular groove, and a coiled spring seated in said grooves, the outer diameter of said spring coils being greater than the radial depth of the insert groove so that said spring extends into said cylinder groove, the coils of said spring being separated, one from another, to permit said spring to be compressed substantially within the confines of said insert annular groove, said grooves and spring being positioned relative to each other such that an axially and radially inward holding force is applied to said insert from the cylinder and spring.

2. The structure of claim 1 further characterized in that said spring is in contact with the innermost radial surface of said insert groove.

3. The structure of claim 2 further characterized in that the outer diameter of the spring coils is substantially the same as the axial depth of said insert groove.

4. The structure of claim 2 further characterized in that said spring is in contact with an axial surface of said insert groove and an axial surface of said cylinder groove.

5. The structure of claim 1 further characterized by and including an outwardly chamfered surface in the cylinder at the port.

References Cited in the file of this patent

UNITED STATES PATENTS

| | | |
|---|---|---|
| 2,631,577 | Carter | Mar. 17, 1953 |
| 3,046,965 | Kauffmann et al. | July 31, 1962 |

FOREIGN PATENTS

| | | |
|---|---|---|
| 529,611 | Great Britain | Nov. 25, 1940 |